(12) United States Patent
Peykoff, Sr.

(10) Patent No.: US 12,275,606 B1
(45) Date of Patent: Apr. 15, 2025

(54) FACILITY LAYOUT

(71) Applicant: NIAGARA BOTTLING, LLC, Diamond Bar, CA (US)

(72) Inventor: Andrew Dimitri Peykoff, Sr., Newport Coast, CA (US)

(73) Assignee: Niagara Bottling, LLC, Diamond Bar, CA (US)

( * ) Notice: Subject to any disclaimer, the term of this patent is extended or adjusted under 35 U.S.C. 154(b) by 0 days.

(21) Appl. No.: 18/397,893

(22) Filed: Dec. 27, 2023

(51) Int. Cl.
*B65G 69/28* (2006.01)
*B65G 67/04* (2006.01)

(52) U.S. Cl.
CPC .......... *B65G 69/287* (2013.01); *B65G 67/04* (2013.01)

(58) Field of Classification Search
CPC .............................. B65G 69/287; B65G 67/04
See application file for complete search history.

(56) References Cited

U.S. PATENT DOCUMENTS

| | | | | |
|---|---|---|---|---|
| 4,950,118 | A | * | 8/1990 | Mueller ............... G05D 1/0242 |
| | | | | 414/343 |
| 4,968,209 | A | | 11/1990 | Noble |
| 5,091,855 | A | | 2/1992 | Umehara et al. |
| 5,220,263 | A | | 6/1993 | Onishi et al. |
| 5,752,584 | A | | 5/1998 | Magoto et al. |
| 5,997,241 | A | * | 12/1999 | Malcolm ............... B23Q 7/1431 |
| | | | | 414/806 |
| 6,241,453 | B1 | | 6/2001 | Upmeyer |
| 6,311,102 | B1 | | 10/2001 | Minakami |
| 6,705,523 | B1 | | 3/2004 | Stamm et al. |
| 7,648,329 | B2 | | 1/2010 | Chilson et al. |
| 7,695,235 | B1 | | 4/2010 | Rallis |
| 7,894,939 | B2 | | 2/2011 | Zini et al. |
| 7,980,808 | B2 | * | 7/2011 | Chilson ............... B60L 15/38 |
| | | | | 701/500 |
| 7,988,405 | B2 | | 8/2011 | Ellington |
| 7,996,109 | B2 | | 8/2011 | Zini et al. |
| 8,010,230 | B2 | | 8/2011 | Zini et al. |

(Continued)

FOREIGN PATENT DOCUMENTS

| | | | | |
|---|---|---|---|---|
| AU | 2018265596 | B2 | * 2/2024 | ............... B65G 1/00 |
| CA | 2721345 | A1 | * 10/2009 | .......... B60L 15/2036 |

(Continued)

OTHER PUBLICATIONS

International Search Report and Written Opinion for Application No. PCT/US2024/026842 dated Jul. 17, 2024 (14 pages).

(Continued)

*Primary Examiner* — Thomas Randazzo
(74) *Attorney, Agent, or Firm* — Michael Best & Friedrich LLP (57) ABSTRACT

A facility including a loading dock having a plurality of dock doors to accommodate vehicles or trailers for loading pallets, a staging area located proximate to the loading dock, and a plurality of loading zones. The staging area includes a plurality of staging lanes of finished products. Each staging lane is stocked with the finished products from the facility. Each of the plurality of loading zones includes a subset of the plurality of dock doors and a corresponding subset of staging lanes located proximate to the subset of the plurality of dock doors for supplying pallets for loading into vehicles docked at the subset of the plurality of dock doors.

24 Claims, 5 Drawing Sheets

(56) References Cited

U.S. PATENT DOCUMENTS

| | | |
|---|---|---|
| 8,075,243 B2 | 12/2011 | Chilson et al. |
| 8,075,244 B2 | 12/2011 | Ellington |
| 8,192,137 B2 | 6/2012 | Ross et al. |
| 8,204,624 B2 | 6/2012 | Zini et al. |
| 8,210,791 B2 * | 7/2012 | Chilson .................. G05D 1/024 |
| | | 414/809 |
| 8,360,443 B2 | 1/2013 | Ellington |
| 8,471,522 B2 | 6/2013 | Virk |
| 8,509,981 B2 | 8/2013 | Pfeiffer |
| 8,651,797 B2 | 2/2014 | Magoto |
| 8,757,326 B2 | 6/2014 | Hannemann et al. |
| 8,892,241 B2 | 11/2014 | Weiss |
| 8,998,554 B2 | 4/2015 | Toebes et al. |
| 9,020,679 B2 | 4/2015 | Zini et al. |
| 9,026,301 B2 | 5/2015 | Zini et al. |
| 9,082,112 B2 | 7/2015 | Sullivan et al. |
| 9,260,125 B2 | 2/2016 | Ellington et al. |
| 9,371,183 B2 | 6/2016 | Toebes et al. |
| 9,403,547 B2 | 8/2016 | Ellington |
| 9,475,649 B2 | 10/2016 | Toebes et al. |
| 9,499,062 B2 | 11/2016 | Sullivan et al. |
| 9,563,206 B2 | 2/2017 | Zini et al. |
| 9,592,961 B2 | 3/2017 | Weiss |
| 9,679,270 B2 | 6/2017 | Zini et al. |
| 9,758,049 B2 | 9/2017 | Sullivan et al. |
| 9,840,350 B2 | 12/2017 | Moran et al. |
| 9,864,371 B2 | 1/2018 | Douglas et al. |
| 9,908,696 B1 | 3/2018 | Zevenbergen |
| 9,981,808 B2 | 5/2018 | Sullivan et al. |
| 10,081,504 B2 | 9/2018 | Walford et al. |
| 10,081,813 B2 | 9/2018 | Li |
| 10,087,000 B2 | 10/2018 | Zevenbergen |
| 10,137,816 B2 | 11/2018 | Harper et al. |
| 10,179,710 B2 | 1/2019 | Cooper |
| 10,207,595 B2 | 2/2019 | Sullivan et al. |
| 10,274,967 B2 | 4/2019 | Nordbruch |
| 10,315,843 B2 | 6/2019 | Magens et al. |
| 10,343,881 B2 | 7/2019 | Guo et al. |
| 10,401,864 B2 | 9/2019 | Sussman et al. |
| 10,449,872 B2 | 10/2019 | Sullivan et al. |
| 10,466,692 B2 | 11/2019 | Douglas et al. |
| 10,472,173 B2 | 11/2019 | Guo et al. |
| 10,494,205 B1 | 12/2019 | Hoofard et al. |
| 10,577,200 B2 | 3/2020 | Cooper |
| 10,584,002 B2 | 3/2020 | Shibata et al. |
| 10,678,228 B2 | 6/2020 | Voorhies et al. |
| 10,723,555 B2 | 7/2020 | Hance et al. |
| 10,787,315 B2 | 9/2020 | Hance et al. |
| 10,815,080 B2 | 10/2020 | Anderson |
| 10,822,170 B2 * | 11/2020 | Hance .................... B65G 1/137 |
| 10,875,722 B2 | 12/2020 | Sullivan et al. |
| 10,899,591 B2 | 1/2021 | Soder |
| 10,981,463 B2 | 4/2021 | Sullivan et al. |
| 11,040,839 B2 | 6/2021 | Wieschemann et al. |
| 11,104,547 B2 | 8/2021 | Dayrell |
| 11,119,487 B2 | 9/2021 | Jarvis et al. |
| 11,124,372 B2 | 9/2021 | Hoofard et al. |
| 11,124,401 B1 | 9/2021 | Jarvis et al. |
| 11,142,413 B2 | 10/2021 | Hoofard et al. |
| 11,180,069 B2 | 11/2021 | Jarvis et al. |
| 11,285,838 B2 | 3/2022 | Miet et al. |
| 11,286,118 B2 | 3/2022 | Sullivan et al. |
| 11,358,813 B2 | 6/2022 | Walford et al. |
| 11,402,830 B2 | 8/2022 | Sullivan et al. |
| 11,498,766 B2 | 11/2022 | Zhou et al. |
| 11,507,071 B2 | 11/2022 | Voorhies et al. |
| 11,518,627 B2 | 12/2022 | Von |
| 11,548,743 B2 | 1/2023 | Hoofard et al. |
| 11,565,602 B2 | 1/2023 | Sullivan et al. |
| 11,693,403 B2 | 7/2023 | Sellner |
| 11,709,057 B2 | 7/2023 | Teboulle |
| 11,724,890 B2 | 8/2023 | Sullivan et al. |
| 11,748,699 B2 | 9/2023 | Godwin et al. |
| 11,827,468 B2 | 11/2023 | Hoofard et al. |
| 2002/0123918 A1 * | 9/2002 | Brown .................... G06Q 10/06 |
| | | 705/28 |
| 2003/0198544 A1 * | 10/2003 | Campbell ............ B65G 63/022 |
| | | 414/340 |
| 2003/0235489 A1 | 12/2003 | Hoff |
| 2007/0269299 A1 * | 11/2007 | Ross ...................... G05D 1/024 |
| | | 414/347 |
| 2008/0167817 A1 | 7/2008 | Hessler et al. |
| 2012/0191517 A1 | 7/2012 | Daffin, Jr. et al. |
| 2013/0177379 A1 | 7/2013 | Hoffman et al. |
| 2014/0086714 A1 | 3/2014 | Malik |
| 2016/0247108 A1 | 8/2016 | Acuna et al. |
| 2016/0325973 A1 | 11/2016 | Ellington |
| 2017/0183159 A1 | 6/2017 | Weiss |
| 2017/0270466 A1 | 9/2017 | Kao et al. |
| 2019/0061593 A1 | 2/2019 | Harper et al. |
| 2019/0243383 A1 | 8/2019 | Cantrell et al. |
| 2019/0302764 A1 | 10/2019 | Smith et al. |
| 2020/0102147 A1 | 4/2020 | Sullivan et al. |
| 2020/0216264 A1 | 7/2020 | Martinez et al. |
| 2020/0391987 A1 | 12/2020 | Flottran |
| 2021/0024112 A1 | 1/2021 | Ting et al. |
| 2021/0116928 A1 | 4/2021 | Deng et al. |
| 2021/0147203 A1 | 5/2021 | Soder |
| 2021/0221612 A1 | 7/2021 | Rogers et al. |
| 2021/0237596 A1 | 8/2021 | Butina et al. |
| 2021/0276800 A1 | 9/2021 | Luckay |
| 2021/0316975 A1 | 10/2021 | Yeo et al. |
| 2021/0347569 A1 | 11/2021 | Dayrell |
| 2021/0373572 A1 | 12/2021 | Hunter et al. |
| 2021/0395014 A1 | 12/2021 | Chen et al. |
| 2022/0024738 A1 | 1/2022 | Le Polotec et al. |
| 2022/0100198 A1 | 3/2022 | Solanki et al. |
| 2022/0144564 A1 | 5/2022 | Hoofard et al. |
| 2022/0250841 A1 | 8/2022 | Dayrell |
| 2022/0299995 A1 | 9/2022 | Ganapathi et al. |
| 2022/0338719 A1 | 10/2022 | Walford et al. |
| 2022/0371836 A1 | 11/2022 | Möllmann et al. |
| 2022/0388783 A1 | 12/2022 | Wintz et al. |
| 2022/0396441 A1 | 12/2022 | Möllmann et al. |
| 2023/0014612 A1 | 1/2023 | Zhou et al. |
| 2023/0161351 A1 | 5/2023 | Prasad et al. |
| 2023/0169449 A1 * | 6/2023 | Hoofard ............... G06K 7/1417 |
| | | 705/14.62 |
| 2023/0173939 A1 | 6/2023 | Sullivan et al. |
| 2023/0219761 A1 | 7/2023 | Garifi et al. |
| 2023/0257200 A1 | 8/2023 | Iellimo |
| 2023/0271785 A1 | 8/2023 | Gravelle et al. |
| 2023/0322438 A1 | 10/2023 | Kremer |
| 2023/0373722 A1 * | 11/2023 | Eckman ............... G05D 1/0251 |

FOREIGN PATENT DOCUMENTS

| | | | | |
|---|---|---|---|---|
| DE | 102021108419 B4 * | 10/2022 | ........... G05D 1/0265 |
| JP | H05286513 A * | 11/1993 | ............... B65G 1/00 |
| JP | 2006298638 A | 11/2006 | |
| WO | 2001040082 A1 | 6/2001 | |
| WO | 2012083062 A1 | 6/2012 | |
| WO | 2015150404 A1 | 10/2015 | |
| WO | 2021078418 A1 | 4/2021 | |
| WO | 2021176310 A1 | 9/2021 | |

OTHER PUBLICATIONS

International Search Report and Written Opinion for Application No. PCT/US2024/026839 dated Jul. 17, 2024 (17 pages).

International Search Report and Written Opinion for Application No. PCT/US2024/026846 dated Aug. 19, 2024 (8 pages).

International Search Report and Written Opinion for Application No. PCT/US2024/026850 dated Aug. 21, 2024 (8 pages).

Herrero-Perez et al, D. Modeling Distributed Transportation Systems Composed of Flexible Automated Guided Vehicles in Flexible Manufacturing Systems, Google Scholar, IEEE Transactions on Industrial Informatics, vol. 6, No. 2, May 2010, pp. 166-180.

Draganjac et al, I. Decentralized Control of Multi-AGV Systems in Autonomous Warehousing Applications, Google Scholar, IEEE (56) References Cited

OTHER PUBLICATIONS

Transactions on Automation Science and Engineering, vol. 13, No. 4, Oct. 2016, pp. 1433-1447.

* cited by examiner

FIG. 5

FACILITY LAYOUT

FIELD

The present disclosure relates to a facility layout for expediting loading products and other items onto trailers and/or trucks, and more efficient moving and handling of materials, particularly in a manufacturing operation.

BACKGROUND

Distribution and manufacturing facilities typically include production areas, storage areas, and a loading dock for loading products onto vehicles or trailers. Automatic/autonomous guided vehicles (AGVs) are used to autonomously move the products to various locations within the distribution and/or manufacturing facility and ultimately onto the trailer at the loading docks for shipment. These AGVs are programmed for all tasks that may be needed throughout a facility in an on-demand basis. All of the AGVs queue and await instructions at common home position and return to the common home position queue upon completion of the task. The use of a common home position and the unlimited use each AGV to perform any warehousing task within the facility leads to excessive traffic and congestion of AGVs within the facility.

SUMMARY

In some aspects, the techniques described herein relate to a facility including: a loading dock having a plurality of dock doors to accommodate vehicles for loading finished products; a staging area located proximate to the loading dock, the staging area including a plurality of staging lanes of the finished products, wherein each staging lane is stocked with the finished products from the facility for removal onto the loading dock and loading into vehicles assigned to the plurality of dock doors at the loading dock; and a plurality of loading zones, wherein each of the plurality of loading zones includes a subset of the plurality of dock doors and a corresponding subset of staging lanes located proximate to the subset of the plurality of dock doors for supplying the finished products for loading into vehicles docked at the subset of the plurality of dock doors.

In some aspects, the techniques described herein relate to a method of operating a facility, the method including: providing finished products in the facility; removing the finished products from the facility; accommodating vehicles at a plurality of dock doors at a loading dock; placing the finished products from the facility into staging lanes within a staging area located proximate to the loading dock; removing the finished products from the staging lanes; loading the finished products from the staging lanes into vehicles accommodated at the plurality of dock doors; and defining a plurality of loading zones, wherein each loading zone includes a subset of the plurality of dock doors and a corresponding subset of staging lanes located proximate to the subset of the plurality of dock doors for supplying the finished products for loading into vehicles docked at the subset of the plurality of dock doors.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
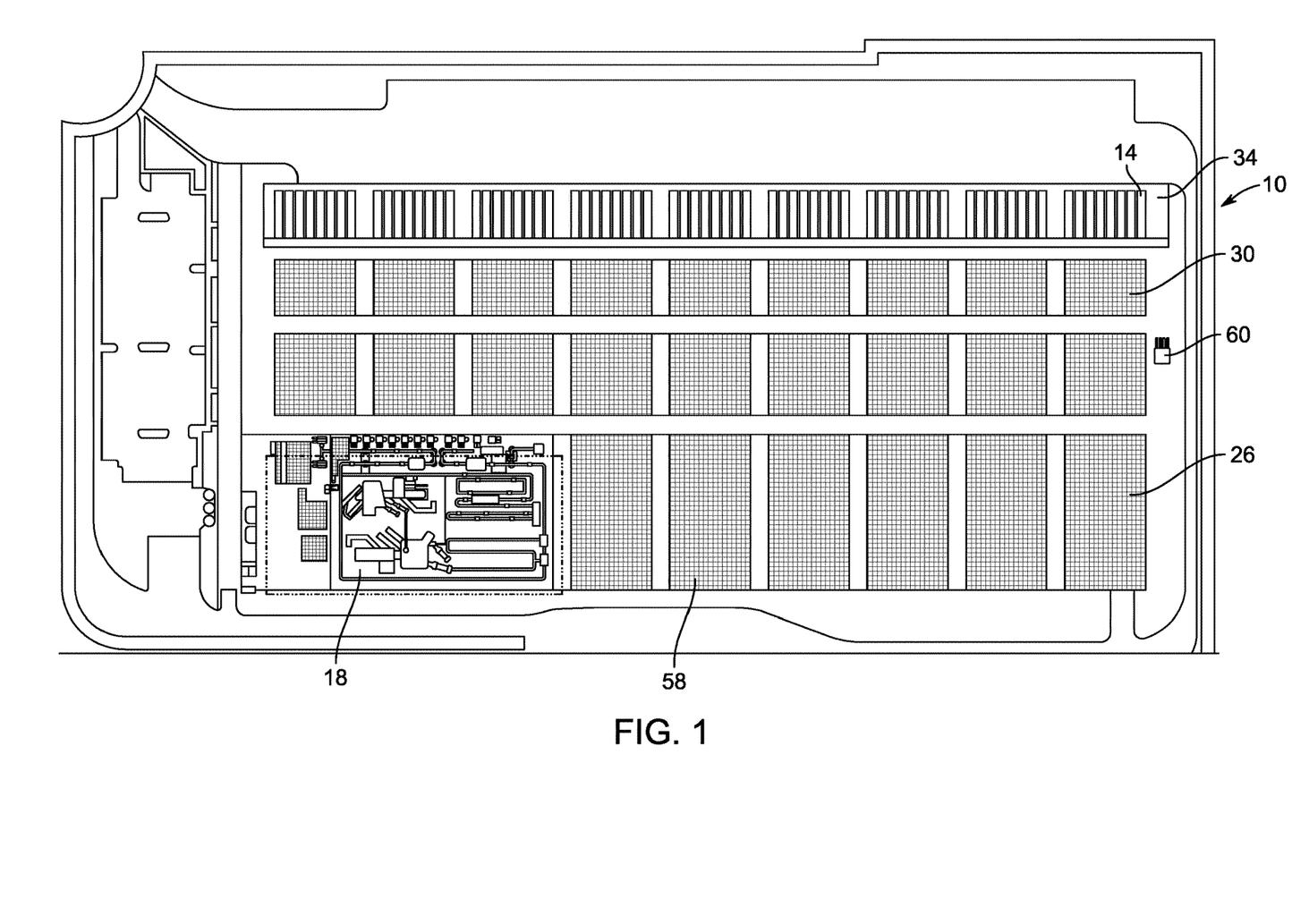
FIG. 1 is a plan view of a facility according to an embodiment of the invention.

FIG. 1 illustrates a manufacturing or distribution plant or facility (hereinafter referred to as a "facility 10"), for producing a product, storing the product, staging the product, and loading the product onto a vehicle such as a trailer 14. In other embodiments, the vehicle may be a van, a truck, or a similar vehicle. The facility 10 includes a production line 18 for producing pallets of finished products 22, an intermediary storage area 26 where the pallets of finished products 22 are stored (preferably immediately after removal from the production line 18) within the facility 10 after being removed from the production line 18, a staging area 30 where pallets of finished products 22 are arranged prior to loading (either directly from the production line 18 or from the intermediary storage area 26), and a loading dock 34 including dock doors 38 to accommodate the trailers 14 for loading pallets of finished products 22 from the staging area 30 onto the trailers 14 through the dock doors 38.

Figure 2:
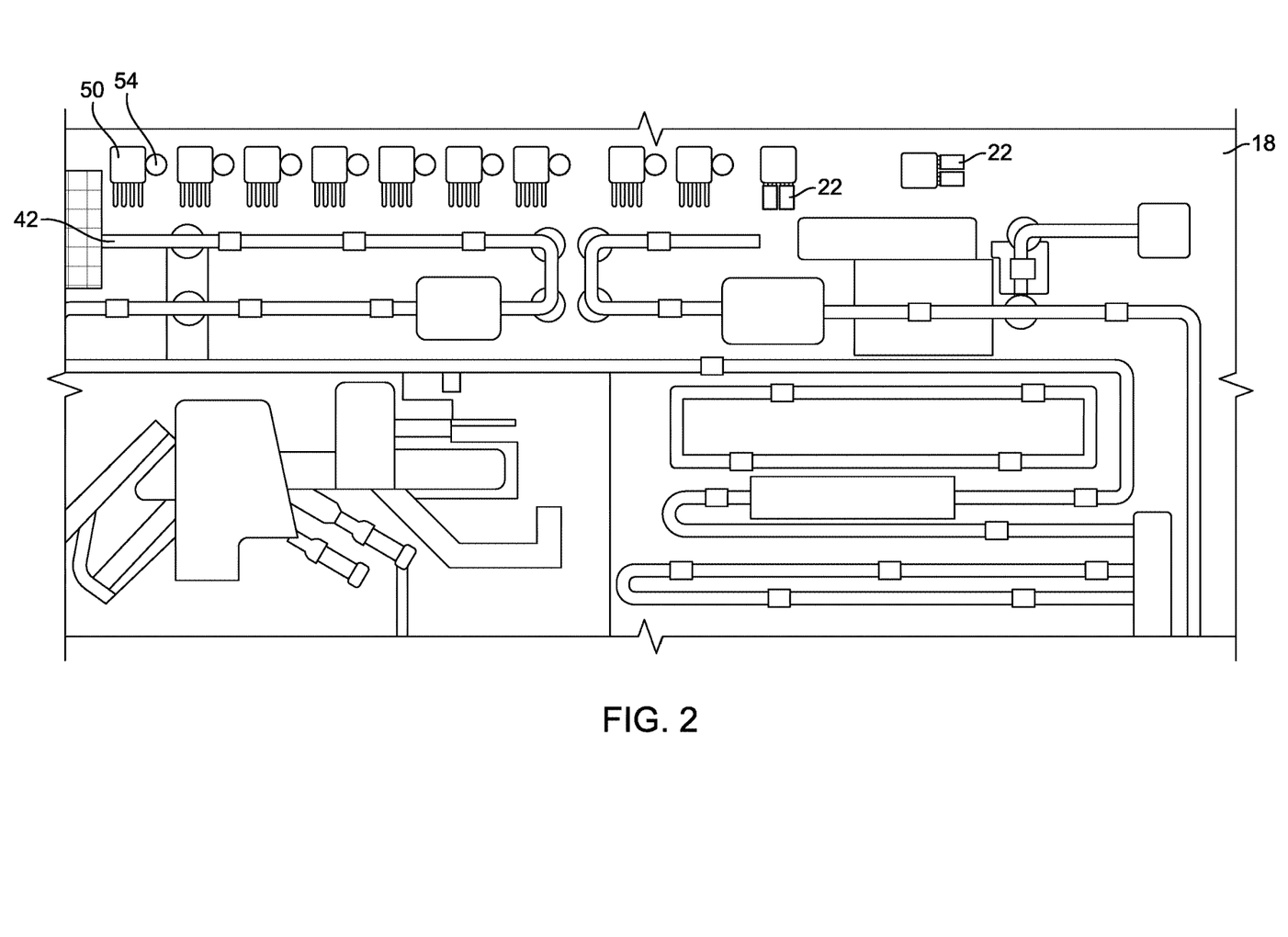
FIG. 2 is an enlarged view of the facility of FIG. 1 showing a production line.

With reference to FIG. 2, the production line 18 includes machinery to produce a product or a variety of products. In some embodiments, the production line 18 produces bottles unfilled or filled with liquid. The liquid may define water or alternative ready-to-drink beverages. In such embodiments, the machinery may include pre-form injection molding machines, blow molding machines, and bottle filling machines in order to produce the filled bottles. In other embodiments, the production line 18 may produce an alternative product produced by other production machinery. Once produced, the filled bottles are delivered to a packaging line where they are packaged into cases of variable sizes. The cases are then stacked onto a pallet. The pallet stacked with the cases defines the pallet of finished products 22. In other embodiments, the production line 18 may produce an alternative finished product. For example, the finished product may define a case, a singular product, a box, a container, or the like.

The pallet of finished products 22 is moved along a conveyor system to an exit conveyor 42. The conveyor system defines interconnected conveyors that move the pallets of finished products 22 through the production line 18. In other embodiments, the conveyor system may define one conveyor that transports the pallets of finished products 22 through the production line 18. The exit conveyor 42 is located at the end of the conveyor system to support and expose the finished products 22 for removal from the production line 18. Once on the exit conveyor 42, the pallets of finished products 22 can be moved to the intermediary storage area 26. The intermediary storage area 26 defines an area of a floor of the facility 10 where pallets of finished products 22 are stored prior to loading. In other embodiments, the intermediary storage area 26 may define racks for storing the pallets of finished products 22 in a vertical orientation. In further embodiments, the intermediary storage area 26 may include a combination of floor storage and racks.

With reference to FIGS. 1 and 2, the facility 10 includes warehouse AGVs 50 dedicated to moving between the production line 18 and the staging area 30 to remove the pallets of finished products 22 from the exit conveyor 42 of the production line 18 and place them directly into the intermediary storage area 26, directly into the staging area 30, or place them directly into the intermediary storage area 26 and subsequently into the staging area 30. AGVs can be guided by laser (e.g., a laser guided vehicle or LGV) or by other methods. The area between and including the production line 18 and the staging area is referred to as the transition area. The transition area likewise encompasses the area between and including the production line and an intermediary storage area. The transition area is a designated area within the facility 10 for allowing the travel of warehouse AGVs 50.

The warehouse AGVs 50 each include a drive system, a rechargeable battery, and a warehouse AGV controller that controls operations of the warehouse AGV 50. The warehouse AGV controller includes one or more electronic processors, non-volatile and volatile memory, and a communication interface. The communication interface is configured to wirelessly communicate with a control server. The control server is in communication with the warehouse AGVs 50 to provide instructions to the warehouse AGVs 50 to perform tasks requiring movement within the transition area. In one example implementation, the warehouse AGVs 50 may each be an E80® LGV, the control server may be utilizing the software platform SM.I.LE80 from E80® to control the warehouse AGVs 50, and the wireless communication occurs via Wi-Fi or other suitable wireless communication. In other embodiments, instructions may be uploaded onto the warehouse AGV 50 such that the communication interface communicated with the control server through a wired connection. For example, the warehouse AGV 50 may use the communication interface to communicate with the control server via a wired connection available at and dedicated to one of the warehouse chargers 54.

The rechargeable batteries are rechargeable via warehouse chargers 54 located proximate to the exit conveyor 42. The warehouse chargers 54 are evenly spaced proximate to the exit conveyor 42. In other embodiments, the warehouse chargers 54 may be unevenly spaced proximate to the exit conveyor 42. In yet further embodiments, the facility 10 may solely include one warehouse AGV 50 and one warehouse charger 54. The warehouse charger 54 defines a home position for the warehouse AGV 50. When the warehouse AGV 50 is idle, the warehouse AGV 50 is positioned in the home position. Therefore, the warehouse AGV 50 is aligned with the exit conveyor 42 when the warehouse AGV 50 is idle. In some embodiments, the home position for the warehouse AGV 50 may be at a specific warehouse charger 54. In other embodiments, the home position for the warehouse AGV 50 may be at any of the warehouse chargers 54. In further embodiments, the home position may be at an alternative location within the facility 10.

The control server provides instructions to the warehouse AGV controller regarding when to pick up the pallets of finished products 22 and when to return to the home position. Specifically, when at least one of the pallets of finished products 22 is available for pickup on the exit conveyor 42, the control server instructs the warehouse AGV 50 to pick up the pallets of finished products 22. Therefore, when the production line 18 is operating at full capacity and the pallets of finished products 22 are continually being conveyed to the exit conveyor 42, the control server instructs the warehouse AGV 50 to continuously transport the pallets of finished products 22 to the intermediary storage area 26 or to the staging area 30. The control server may additionally instruct the warehouse AGV 50 to pick up raw materials (e.g., plastic pellets, labels, shrink wrap, or the like) from raw material storage racks 58 and to deliver the raw materials to the production line when the production line 18 requires additional raw material. In such embodiments, when the production line 18 does not require additional raw material and the pallets of finished products 22 are not ready for pick up, the control server instructs the warehouse AGV 50 to return to the home position.

In some embodiments, the warehouse AGV controller queues multiple instructions from the control server, and the instructions are executed by the warehouse AGV 50 in a priority order. Alternatively, the control server queues multiple instructions for a warehouse AGV 50, and the instructions are sent by the control server to the warehouse AGV 50 in priority order. The priority order may be based on which of the pallets of finished products 22 is closest to the warehouse AGV 50 or which travel path is the most efficient for the warehouse AGV 50. In other embodiments, the priority order may be based on alternative characteristics. When there are no pallets of finished products 22 ready for pick up on the exit conveyor 42, the warehouse AGV 50 returns to the home position. Once in the home position, the warehouse AGV 50 becomes idle and the warehouse charger 54 charges the warehouse AGV 50. Therefore, the warehouse AGV 50 becomes idle when in the home position and awaits further instructions from the control server. In other embodiments, the warehouse AGV 50 may not immediately return to the home position when idle. Alternatively, the warehouse AGV 50 may park and sit idle at an alternative location within the facility.

The warehouse AGV 50 operates in an in-service condition in which the warehouse AGV 50 is ready to receive and act on instructions from the control server, and an out-of-service condition in which the warehouse AGV 50 is unavailable for acting on instructions from the control server. The in-service condition includes when the warehouse AGV 50 is idle. The warehouse AGV 50 remains in the in-service condition while the state-of-charge remains above a threshold. In some embodiments, the threshold is when the state-of-charge is at 50% of a maximum charge level. In other embodiments, the threshold may be a percentage below or above 50%. When the state-of-charge falls below the threshold, the control server instructs the warehouse AGV 50 to move to the warehouse charger 54 and the warehouse AGV 50 transitions to the out-of-service condition. Thereafter, the warehouse charger 54 charges the rechargeable battery to a fully charged condition. A fully charged condition is defined as a full or near full charge level or a charge level recommended by the manufacturer of the AGV to extend the overall life of the battery, e.g., a state of charge of 80%-100%. Other out-of-service charging can include balance charging operable to balance or equalize the voltage of each battery cell within the rechargeable battery of the AGV. The warehouse AGV 50 remains in the out-of-service condition until the rechargeable battery is at the fully charged condition or until balance charging is completed. Then, the warehouse AGV 50 transitions to the in-service condition. In other embodiments, when the state-of-charge falls below the threshold or balance charging is required, the control server may instruct the warehouse AGV 50 to move to an alternative charger away from the exit conveyor 42.

While in the in-service condition, the control server instructs the warehouse AGV 50 to transport the pallets of finished products 22 and return to the home position regardless of the state-of-charge of the warehouse AGV 50. Further, the warehouse charger 54 charges the rechargeable battery regardless of the state-of-charge of the rechargeable battery when the warehouse AGV 50 is in the home position and the warehouse charger 54 discontinues charging regardless of the state-of-charge of the rechargeable battery when the warehouse AGV 50 leaves the home position. In other words, the warehouse AGV 50 is not forced to remain on the warehouse charger 54 until a fully charged condition is reached. Rather, the control server may or may not instruct the warehouse AGV 50 to move away from the warehouse charger 54 prior to the warehouse charger 54 fully charging the rechargeable battery. Since the warehouse charger 54 is not required to fully charge the rechargeable battery, the AGVs can stay in-service longer and delay the requirement to execute out-of-service charging. The phrase "regardless of the state of charge" in the in-service condition presumes that the state-of-charge is above the minimum threshold discussed above that would otherwise place the AGV in an out-of-service condition. For example, as long as the state-of-charge is above the minimum threshold, the above actions will be performed regardless of how high the state-of-charge is above the minimum threshold.

In operation, the production line 18 produces the pallets of finished products 22 and provides the pallets of finished products 22 to the exit conveyor 42. Once at the exit conveyor 42, the control server instructs the warehouse AGV 50 located in the home position to pick up the pallets of finished products 22 from the exit conveyor 42. Since the warehouse AGV 50 is aligned with the exit conveyor 42 in the home position the warehouse AGV 50 moves forward to pick up the pallets of finished products 22 from the exit conveyor 42. The warehouse AGV 50 then transports the pallets of finished products 22 to the intermediary storage area 26 or to the staging area 30. If there are additional pallets of finished products 22 on the exit conveyor 42 ready for pick up, the control server instructs the warehouse AGV 50 (or a different warehouse AGV) to pick up the pallets of finished products 22 and transport them to the intermediary storage area 26 or to the staging area 30. As mentioned above, the warehouse AGVs 50 can move the pallets of finished products 22 from the exit conveyor 42 directly into the staging area 30 (as opposed to the intermediary storage area 26). In some embodiments, anywhere between 0 to 100% (e.g., about 80%) of the finished products in the staging area can come directly from the exit conveyor 42 without being first deposited in the intermediary storage area 26. These warehouse AGVs 50 move in designated areas between the production line 18 and the staging area 30.

If there are no pallets of finished products 22 on the exit conveyor 42 ready for pick up, the warehouse AGV 50 returns to the home position. While at the home position, the warehouse charger 54 charges the rechargeable battery of the warehouse AGV 50. When the production line 18 requires additional raw materials, the control server instructs the warehouse AGV 50 to retrieve the raw materials from the raw material storage rack and deliver the raw materials to the production line 18. Once the raw material is delivered, the control server instructs the warehouse AGV 50 to return to the home position.

The facility 10 further includes additional warehouse AGVs 60 dedicated to removing pallets of finished products 22 from the intermediary storage area 26 and placing them into the staging area 30. The additional warehouse AGVs 60 solely move between the intermediary storage area 26 and the staging area 30. In other words, the warehouse AGVs 60 are dedicated to move finished products from the intermediary storage area 26 to the staging area 30. If required, the warehouse AGVs 60 can be instructed for other tasks (e.g., raw material delivery or transport of finished product 22 from the exit conveyor 42). Warehouse AGVs 50 have traffic right of way over warehouse AGVs 60.

In other embodiments, the warehouse AGVs 50 that move the pallets of finished products 22 from the exit conveyor 42 to the staging area 30 or the intermediary storage area 26 may also remove the pallets of finished products 22 from the intermediary storage area 26 and place them into the staging area 30. However, the warehouse AGVs 50 are preferably dedicated to removing pallets of finished products 22 from the exit conveyor 42. Warehouse AGVs 50 can additionally move finished products 22 from the intermediate storage area 26 to the staging area 30, but preferably only if doing so does not cause finished products 22 to back up at the exit conveyor 42 (and potentially stop the production line 18).

When the warehouse AGVs 50 transport the pallets of finished products 22 from the exit conveyor 42 to the staging area 30 or warehouse AGVs 60 transport pallets of finished products from the intermediary storage area 26 to the staging area 30, the warehouse AGVs 50, 60 enter the staging area 30 from a side of the staging area 30 opposite to the dock doors 38. The warehouse AGVs 50 move the pallets of finished products 22 in pairs from the exit conveyor 42 to the intermediary storage area 26, and in pairs from the exit conveyor 42 to the staging area 30. The warehouse AGVs 60 move the pallets of finished products 22 in pairs from the intermediary storage area 26 to the staging area 30. The warehouse AGVs 50, 60 include two pairs of vertically actuable forks used to lift the pairs of pallets. Alternatively, the warehouse AGVs 50, 60 could include a single pair of forks for moving pallets one at a time.

Figure 3:
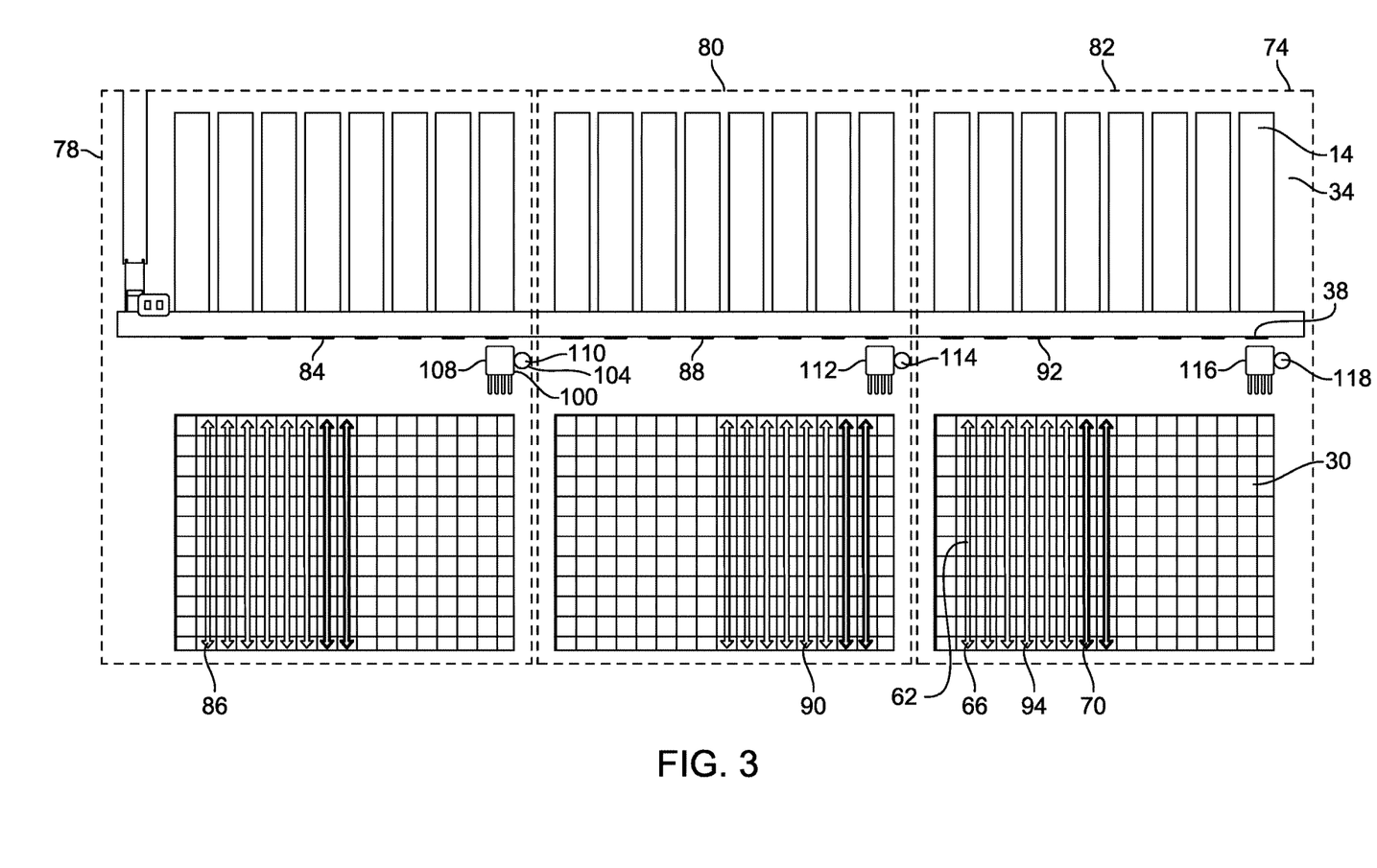
FIG. 3 is an enlarged view of the facility of FIG. 1 showing a plurality of loading zones, each with a loading AGV positioned in a home position.
Figure 4:
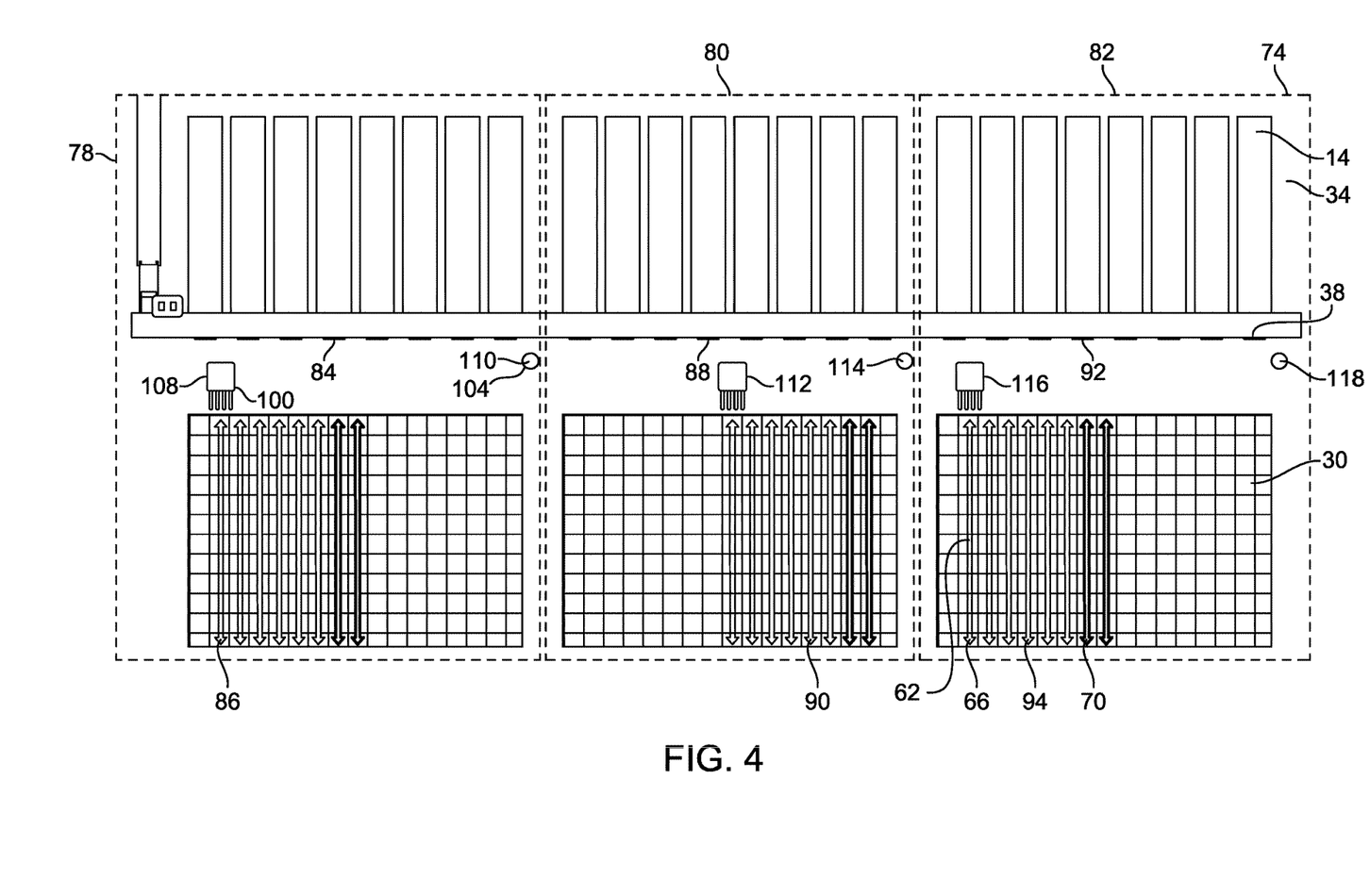
FIG. 4 is an enlarged view of the facility of FIG. 1 showing a plurality of loading zones, each with a loading AGV moving to the staging area.
Figure 5:
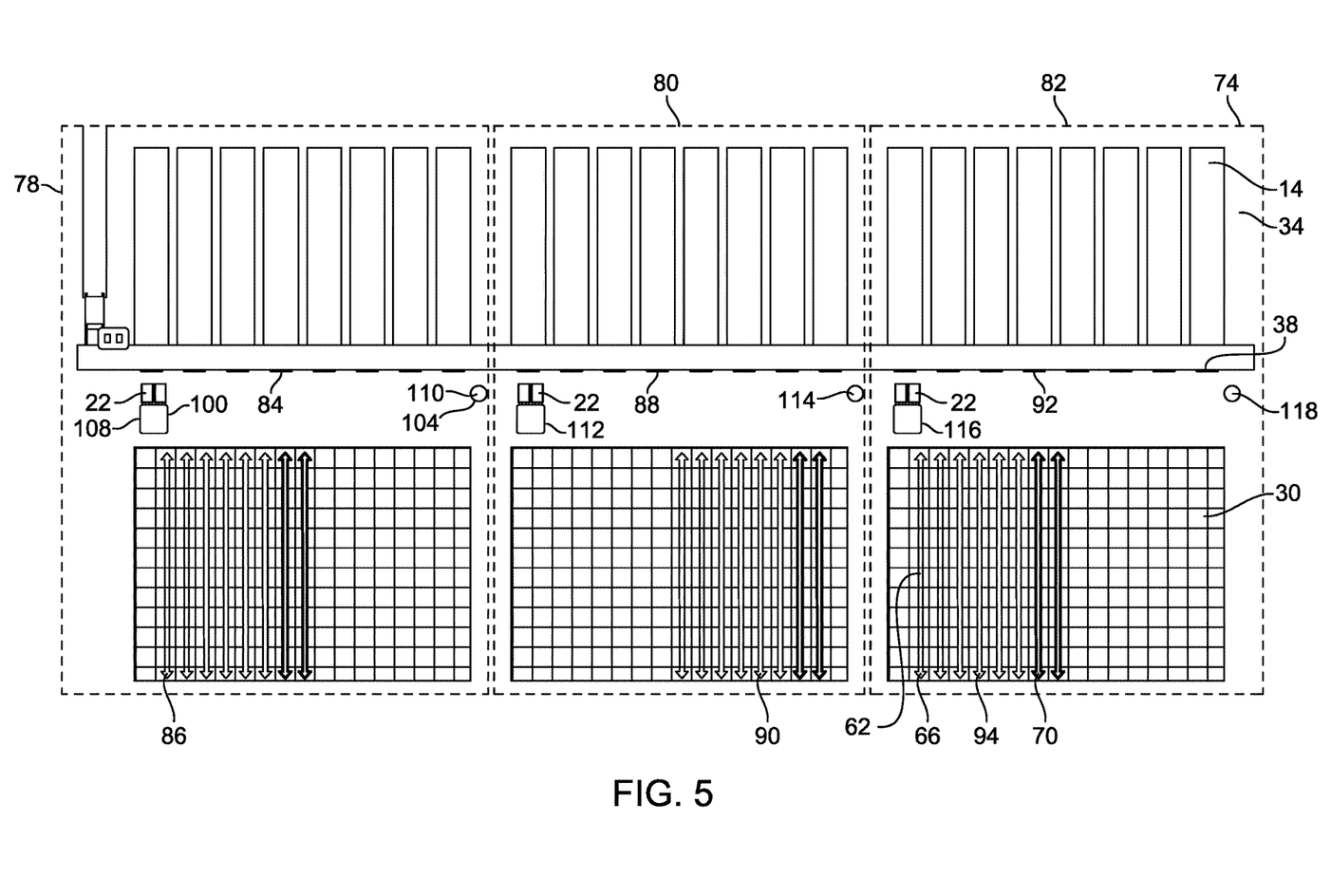
FIG. 5 is an enlarged view of the facility of FIG. 1 showing a plurality of loading zones, each with a loading AGV moving to the loading dock for loading a trailer.

With reference to FIGS. 3-5, the staging area 30 includes a plurality of staging lanes 62 of the pallets of finished products 22. The staging lanes 62 are stocked with the pallets of finished products 22 from the intermediary storage area 26 or directly from the exit conveyor 42 to await loading into the trailers 14 assigned to the dock doors 38 of the loading dock 34. The dock doors 38 are arranged in series along a first direction and each of the staging lanes 62 are arranged along a second direction orthogonal to the first direction. The staging lanes 62 are stocked such that a first pallet (or pair of pallets) of the pallets of finished products 22 that is stocked in a staging lane 62 from the intermediary storage area 26 is the first pallet (or pair of pallets) removed from the staging lane 62 into the loading dock 34 for loading onto the trailer 14. In other words, the pallets of finished products 22 are removed from the staging area 30 in the order that the pallets of finished products 22 entered the staging area 30. In some embodiments, each of the staging lanes 62 stocks a dedicated product such that each of the staging lanes 62 solely stores a single type of product or SKU. In other embodiments, a single staging lane can include multiple types of products or SKUs.

The staging lanes 62 include A-mover lanes 66 dedicated to pallets of high-volume product and flex lanes 70 reserved for pallets of low-volume products. Each of the A-mover lanes 66 is re-stocked with further pallets of finished products 22 from the intermediary storage area 26 (or directly from the production line 18) once the A-mover lane 66 is fully depleted. Therefore, the A-mover lane 66 is only restocked once the A-mover lane 66 does not have any remaining pallets of finished products 22. The flex lanes 70 are stocked with pallets of low-volume product after the trailer 14 has entered the loading dock 34 with an order requiring pallets of low-volume product. Therefore, the flex lanes 70 are only stocked once the order requirements of the trailer 14 have been established. When the A-mover lanes 66 require replenishment or the trailer 14 requires the low-volume product, the warehouse AGV 50 transports the pallets of finished products 22 from the intermediary storage area 26 (or from the production line 18) to the corresponding staging lane 62. For example, if a trailer 14 enters the loading dock 34 and requires product Z, a low volume product, the control server instructs a warehouse AGV 60 to transport pallets of finished product Z to a flex lane 70 for that loading dock 34.

The loading dock 34 includes the dock doors 38. As previously disclosed, the dock doors 38 are arranged in series along the first direction such that the dock doors 38 face the staging area 30. Each of the dock doors 38 accommodates one trailer 14 at a time. Before the trailer 14 enters the loading dock 34, the trailer 14 checks in at the yard gate and information relative to the trailer is entered into to a loading control system. The loading control system, which will be described in more detail below, determines the order requirement of the trailer 14 and assigns the trailer 14 to one of the dock doors 38 according to the order requirement.

The staging lanes 62 and the loading dock 34 are divided into a plurality of loading zones 74. More specifically, each of the plurality of loading zones 74 includes a subset of the staging lanes 62 and a corresponding subset of the dock doors 38. Each of the loading zones 74 may include any number of the staging lanes 62 and any number of the dock doors 38. As an example, the plurality of loading zones 74 include a first loading zone 78, a second loading zone 80 and a third loading zone 82. The first loading zone 78 includes a first subset of the dock doors 84 and a first subset of staging lanes 86 located proximate to the first subset of dock doors 84 for supplying pallets of finished products 22 for loading into trailers 14 docked at the first subset of the dock doors 84. The second loading zone 80 includes a second subset of the dock doors 88 and a second subset of staging lanes 90 located proximate to the second subset of the dock doors 88 for supplying pallets of finished products 22 for loading into trailers 14 docked at the second subset of the dock doors 88. The third loading zone 82 includes a third subset of dock doors 92 and a third subset of staging lanes 94 located proximate to the third subset of dock doors 92 for supplying pallets of finished products 22 for loading into trailers 14 docked at the third subset of the dock doors 92. In some embodiments, the facility 10 includes more than three loading zones 74. In other embodiments, the facility 10 includes three loading zones 74 or less than three loading zones 74.

The subset of the staging lanes 62 in each of the loading zones 74 includes the A-mover lanes 66 and the flex lanes 70, as described above. For example, FIGS. 3-5 illustrate the A-mover lanes 66 and the flex lanes 70 as arrows. Each of the arrows represents a lane for the pallets of finished products 22 to be stored. In the depicted embodiment, each of the loading zones 74 includes six A-mover lanes 66 and two flex lanes 70. However, the subset of the staging lanes 62 in each of the loading zones may include as many A-mover lanes 66 and flex lanes 70 as desired. The loading control system of the loading dock 34 assigns the trailers 14 to one of the subset of dock doors 38 in a particular loading zone 74 based on the order requirements of the trailer 14 and the subset of the staging lanes 62 in the loading zones 74. More specifically, the loading control system considers which products are required to complete the order for the trailer 14 and determines which loading dock 34 to assign to the trailer 14 based on which of the dock doors 38 is a best dock door. The best dock door is the dock door 38 that is currently available and is proximate to the most products needed to complete the order. Therefore, the loading control system analyzes the products in the staging lanes 62 in each of the loading zones 74 and determines the best dock door based on which zone includes staging lanes 62 having the most products needed to complete the order. For example, the first loading zone 78 includes products A and B in the first subset of staging lanes 86 and the second loading zone 80 includes products C and D in the second subset of staging lanes 90. Trailer 1 requires product D and Trailer 2 requires product C. Trailers 1 and 2 will both be assigned to dock doors within the second subset of the dock doors 86 in the second loading zone 80 since products C and D are located in the second subset of staging lanes 90. In other embodiments, the subset of the staging lanes 62 may solely include the A-mover lanes 66. In further embodiments, the subset of the staging lanes 62 may define an alternative type of lane. Although the figures illustrate vacant gaps between staging lanes 86 of adjacent loading zones, some of these gaps could be filed with additional staging lanes 86 or even used to store finished products as an expansion of the intermediary storage area 26.

Each of the loading zones 74 includes a loading AGV 100 for loading the trailers 14 assigned to the subset of the dock doors 38 with pallets of finished products 22 taken from the corresponding subset of staging lanes 62. The loading AGVs 100 move the pallets of finished products 22 in pairs from the staging lanes 62 into the trailers 14 for loading onto the trailers 14. The loading AGVs 100 are substantially similar to the warehouse AGVs 50. The loading AGVs 100 include two pairs of vertically actuable forks used to lift the pairs of pallets. Alternatively, the loading AGVs 50 could include a single pair of forks for moving pallets one at a time.

In other embodiments, the loading AGVs 100 may be an alternative type of AGV. Each of the loading AGVs 100 includes a drive system, a rechargeable battery, and a loading AGV controller that controls operations of the loading AGV 100. The loading AGV controller includes one or more electronic processors, non-volatile and volatile memory, and a communication interface. The communication interface is configured to wirelessly communicate with a control server. The control server is in communication with each of the loading AGVs 100 to provide instructions to each of the loading AGVs 100 to perform tasks requiring movement within each AGV's corresponding loading zone. In one example implementation, the loading AGVs 100 may each be an E80® LGV, the control server may be utilizing the software platform SM.I.LE80 from E80® to control the loading AGVs 100, and the wireless communication occurs via Wi-Fi or other suitable wireless communication. In other embodiments, instructions may be uploaded onto the loading AGV 100 such that the communication interface communicated with the control server through a wired connection. For example, the loading AGV 100 may use the communication interface to communicate with the control server via a wired connection available at and dedicated to a loading charger 104. The rechargeable batteries are rechargeable via the loading chargers 104. Each of the loading zones 74 includes one of the loading chargers 104. The loading charger 104 is disposed to the right of each of the subset of dock doors 38. In other embodiments, the loading charger 104 may be disposed at an alternative position within the loading zone 74 (e.g., between the subset of staging lanes 62, between the subset of staging lanes 62 and the subset of dock doors 38, etc.).

Movement of the loading AGV 100 is constrained to a single loading zone 74 such that the loading AGV 100 can solely pick up the pallets of finished products 22 from the subset of staging lanes 62 in the loading zone 74 and deliver the pallets of finished products 22 to the trailers 14 corresponding to the dock doors 38 within the loading zone 74. In this manner, each loading zone defines a designated area within the facility 10 for limiting the travel of its corresponding AGV 100. Each loading zone defines a designated area of the facility that is different, and in some cases isolated from, the other loading zones. In some embodiments, each loading zone is different, and in some cases isolated from, the transition area. In other embodiments, there is slight overlap between a loading zone and the transition area. For example, staging lanes can be included in both the designated area of a loading zone (allowing a loading AGV 100 to enter from the loading dock side to remove finished products for loading into trailers) and the designated area of the transition area (allowing warehouse AGVs to enter from an opposite side to drop off finished products from the intermediary storage area or directly from the production line).

Further, since the loading charger 104 is located in the loading zone 74, the loading AGV 100 stays in the loading zone 74 to charge. As an example, the first loading zone 78 includes a first AGV 108 and a first AGV charger 110. The first AGV 108 is dedicated to the first loading zone 78 for loading trailers 14 assigned to the first subset of the plurality of dock doors 84 with pallets of finished products 22 taken from the first subset of staging lanes 86. The second loading zone 82 includes a second AGV 112 and a second AGV charger 114. The second AGV 112 is dedicated to the second loading zone 80 for loading trailers 14 assigned to the second subset of the plurality of dock doors 88 with pallets of finished products 22 from the second subset of staging lanes 90. The third loading zone 82 includes a third AGV 116 and a third AGV charger 118. The third AGV 116 is dedicated to the second loading zone 80 for loading trailers 14 assigned to the third subset of the plurality of dock doors 92 with pallets of finished products 22 from the third subset of staging lanes 94.

In some embodiments, the control server dedicates the AGVs 108, 112, and 116 by filtering the instructions sent to the loading AGVs 108, 112, and 116, respectively. Additionally, while the loading AGVs 108, 112, and 116 may be dedicated to a specific loading zone 74, the control server may control the loading AGVs 108, 112, and 116 to leave their respective loading zones 74 for washing, maintenance, or maintaining performance of the rechargeable battery (e.g., out-of-service charging).

The loading AGV 100 picks up the pallets of finished products 22 from a side of the corresponding subset of staging lanes 62 in a facing relationship with the dock doors 38. Therefore, the loading AGV 100 does not enter or exit the side of the staging lanes 62 facing away from the dock doors 38. In other words, the loading AGV 100 and the warehouse AGV 50, 60 enter and exit from opposite sides of the staging area 30. Additionally, movement of the loading AGVs 100 and the warehouse AGVs 50, 60 is orchestrated such that only one AGV enters the staging area 30 in a particular zone 74 at a time. As an example, if the loading AGV 100 enters the staging area 30 in the first loading zone 78, the warehouse AGV 50, 60 will not enter the staging area 30 in the first loading zone 78. Likewise, if the warehouse AGV 50, 60 enters into the staging area 30 in the first loading zone 78, the loading AGV 100 will not enter the staging area 30 in the first loading zone 78. Therefore, desirable spacing between the warehouse AGVs 50, 60 and the loading AGVs 100 is ensured. In other embodiments, both the loading AGVs 100 and the warehouse AGVs 50, 60 can enter the staging area at the same time but cannot occupy the same staging lane at the same time. In yet other embodiments, the loading AGVs 100 and the warehouse AGVs 50, 60 can enter the same staging lane at the same time. For example, they can occupy the same staging lane when a loading AGV 100 is picking up a pair of pallets from one side of the staging lane (i.e., the front of the staged lineup of the pallets of finished products 22) at the same time a warehouse AGV 50, 60 is dropping off a pair of pallets to the opposite side of that same staging lane (i.e., the back of the staged lineup of the pallets of finished products 22).

The loading charger 104 defines a home position for the loading AGV 100. When the loading AGV 100 is idle, the loading AGV 100 is positioned in the home position such that the loading AGV 100 can charge while idle, as shown in FIG. 3. Therefore, the loading AGV 100 is in the home position within the loading zone in which the loading AGV 100 is stationed. The control server provides instructions to the loading AGV controller regarding when to pick up the pallets of finished products 22 from the staging area 30 and when to return to the home position. Specifically, when at least one of the trailers 14 is docked at the subset of dock doors 38 in the loading AGV's loading zone 74 and has an unfilled order, the control server instructs the loading AGV 100 to pick up the pallets of finished products 22 from the staging area 30. In some embodiments, the loading AGV controller queues multiple instructions from the control server, and the instructions are executed by the loading AGV 100 in a priority order. Alternatively, the control server queues multiple instructions for the loading AGV 100, and the control server sends these instructions to the loading AGV 100 in a priority order. The priority order may be based on which of the trailers 14 needs their order first or which order has a shortest fulfillment time. In other embodiments, the priority order may be based on alternative characteristics. When there are no remaining trailers 14 docked at one of the subset of dock doors 38 in the AGV's loading zone 74, the control server instructs the loading AGV 100 to return to the home position. Once in the home position, the loading AGV 100 becomes idle and the loading charger 104 charges the loading AGV 100. Therefore, the loading AGV 100 becomes idle when in the home position and awaits further instructions from the control server. In other embodiments, the loading AGV 100 may return to the home position at alternative times. For example, the control server may be programmed to send the loading AGV 100 to the home position when a characteristic occurs.

The loading AGV 100 operates in an in-service condition in which the AGV is ready to receive and act on instructions from the control server, and an out-of-service condition in which the loading AGV 100 is unavailable for acting on instructions from the control server. The in-service condition includes when the loading AGV 100 is idle. The loading AGV 100 remains in the in-service condition while the state-of-charge remains above a threshold. In some embodiments, the threshold is when the state-of-charge is at 50% of a maximum charge level. In other embodiments, the threshold may be when the state-of-charge may be a percentage below or above 50%. When the state-of-charge falls below the threshold, the control server instructs the loading AGV 100 to move to the loading charger 104 and the loading AGV 100 transitions to the out-of-service condition. Thereafter, the loading charger 104 charges the rechargeable battery to a fully charged condition. A fully charged condition is defined as a full or near full charge level or a charge level recommended by the manufacturer of the AGV to extend the overall life of the battery, e.g., a state of charge of 80%-100%. Other out-of-service charging can include balance charging operable to balance or equalize the voltage of each battery cell within the rechargeable battery of the AGV. The loading AGV 100 remains in the out-of-service condition until the rechargeable battery is in the fully charged condition or until balance charging is completed. Then, the loading AGV 100 transitions to the in-service condition. In other embodiments, when the state-of-charge falls below the threshold or balance charging is required, the control server may instruct the loading AGV 100 to move to a charger outside of the loading zone 74. In other words, in such embodiments the loading AGV 100 moves out of the loading zone 74 to transition to the out-of-service condition. In the event the loading AGV 100 transitions to an out-of-service condition, another in service loading AGV 100 (located elsewhere in the facility) may move into the evacuated loading zone and to substitute or replace the exited loading AGV 100.

While in the in-service condition, the control server instructs the loading AGV 100 to transport the pallets of finished products 22 and return to the home position regardless of the state-of-charge of the loading AGV 100. Further, the loading charger 104 charges the rechargeable battery regardless of the state-of-charge of the rechargeable battery when the loading AGV 100 is in the home position and the loading charger 104 discontinues charging regardless of the state-of-charge of the rechargeable battery when the loading AGV 100 leaves the home position. In other words, when in the in-service condition, the loading AGV 100 is not forced to remain on the loading charger 104 until a fully charged condition is reached. Rather, the control server may or may not instruct the loading AGV 100 to move away from the loading charger 104 prior to the loading charger 104 fully charging the rechargeable battery. Since the loading charger 104 is not required to fully charge the rechargeable battery, the AGVs can stay in-service longer and delay the requirement to execute out-of-service charging. The phrase "regardless of the state of charge" in the in-service condition presumes that the state-of-charge is above the minimum threshold discussed above that would otherwise place the AGV in an out-of-service condition. For example, as long as the state-of-charge is above the minimum threshold, the above actions will be performed regardless of how high the state-of-charge is above the minimum threshold.

In operation, the trailer 14 checks in at the yard gate and is assigned to one of the dock doors 38. The loading AGV 100 assigned to the loading zone 74 in which the assigned dock door 38 is located is instructed by the control server to retrieve the pallets of finished products 22 from the staging lanes 62 in the loading AGV's loading zone 74 based on the order requirements of the trailer 14, as shown in FIG. 4. The loading AGV 100 loads the pallets of finished products 22 in the trailer 14, as shown in FIG. 5. Once the pallets of finished products 22 corresponding to the order requirement have all been loaded onto the trailer 14, the control server determines if another trailer 14 is located within the loading zone 74. If there is a trailer 14 within the loading zone 74, the control server instructs the loading AGV 100 to load the pallets of finished products 22 corresponding to the order requirements of the trailer 14 onto the trailer 14. If there is no trailer 14 within the loading zone 74, the control server instructs the loading AGV 100 to return to the home position, as shown in FIG. 3. In the home position, the loading AGV 100 charges and awaits instructions from the control server.

The facility 10 provides an improved facility layout by separating the functions of the warehouse AGVs 50 and the loading AGVs 100. Separating the warehouse AGVs 50 and the loading AGVs 100 reduces (and in some embodiments eliminates) traffic and congestion between the warehouse AGVs 50 and the loading AGVs 10, optimizing the function of the facility 10. Additionally, separating the staging lanes 62 and the loading dock 34 into the plurality of loading zones 74 further eliminates traffic and congestion between the loading AGVs 100 at the loading dock 34. The decreased traffic and congestion between the AGVs 50, 100 reduces the time required to load the trailer. Decreasing the loading time leads to savings by reducing, or eliminating, the need for operators to drop off trailers 14 for loading. In turn, the need for trailer storage areas and yard jockeys to move the trailers 14 around the loading dock 34 is eliminated. Therefore, loading the trailers 14 requires minimal loading time, allowing the trailers 14 to continue on their route with minimal delay.

In addition, the use of staging lanes increases the percentage utilization of the floor space within a facility. By way of example, typical storage area within a facility may include 10,000 footprints (i.e., 10,000 spaces for storing a pallet of finished goods), and it typically would take 7-10 days to remove those pallets for loading from those footprints. When compared to the present invention, a staging area having 1000 footprints can be likewise cleared or turned in about 24 hours thereby allowing approximately the same throughput of pallets over time, but with only using a fraction (e.g., 1/10th) of the floor space.

Although the disclosure has been described in detail with reference to preferred implementations, variations and modifications exist within the scope and spirit of one or more independent aspects of the disclosure as described. More particularly, one of ordinary skill in the art will understand the scalability of the above-described facility.

What is claimed is:

1. A facility for distributing finished products, the facility comprising:
   a loading dock having a plurality of dock doors to accommodate vehicles for loading the finished products;
   a staging area located proximate to the loading dock, the staging area including a plurality of staging lanes of the finished products, wherein each staging lane of the plurality of staging lanes is stocked with the finished products for removal onto the loading dock and loading into vehicles assigned to the plurality of dock doors at the loading dock; and
   a plurality of loading zones, wherein each loading zone of the plurality of loading zones includes a subset of the plurality of dock doors and a corresponding subset of staging lanes located proximate to the subset of the plurality of dock doors for supplying the finished products for loading into vehicles docked at the subset of the plurality of dock doors, wherein each loading zone of the plurality of loading zones includes an AGV for loading vehicles assigned to the subset of the plurality of dock doors with the finished products taken from the corresponding subset of staging lanes, and wherein each AGV is dedicated to moving within only one designated loading zone for loading the vehicles docked at the subset of the plurality of dock doors with the finished products taken from the corresponding subset of staging lanes.

2. The facility of claim 1, wherein each AGV is configured to take the finished products from a side of the corresponding subset of staging lanes in facing relationship with the subset of the plurality of dock doors.

3. The facility of claim 1, wherein each loading zone includes a charger located within the loading zone for charging the AGV within the loading zone.

4. The facility of claim 1, wherein the plurality of dock doors is arranged in series along a first direction and each of the staging lanes is arranged along a second direction orthogonal to the first direction.

5. The facility of claim 1, wherein each of the staging lanes is configured such that a first pallet of the finished products is stocked in a staging lane is the first pallet removed from the staging lane into the loading dock for loading onto a trailer.

6. The facility of claim 1, wherein the plurality of loading zones includes a first loading zone including a first subset of dock doors, a first subset of staging lanes located proximate to the first subset of dock doors for supplying the finished products for loading into vehicles docked at the first subset of the plurality of dock doors.

7. The facility of claim 6, wherein the plurality of loading zones includes a second loading zone including a second subset of dock doors, a second subset of staging lanes located proximate to the second subset of dock doors for supplying the finished products for loading into vehicles docked at the second subset of the plurality of dock doors.

8. The facility of claim 1, further comprising a transition area upstream of and including the staging area, wherein the facility further includes transition area AGVs dedicated to moving within the transition area.

9. The facility of claim 8, wherein some of the transition area AGVs are dedicated to moving within the transition area to place the finished products into the staging area.

10. The facility of claim 9, wherein the some of the transition area AGVs dedicated to placing the finished products into the staging area enter the staging area from a side of the staging area opposite the dock doors.

11. The facility of claim 9, wherein the some of the transition area AGVs are dedicated to moving within the transition area to remove the finished products from the facility and place them into the staging area.

12. A facility for distributing finished products, the facility comprising:
a loading dock having a plurality of dock doors to accommodate vehicles for loading the finished products;
a staging area located proximate to the loading dock, the staging area including a plurality of staging lanes of the finished products, wherein each staging lane of the plurality of staging lanes is stocked with the finished products for removal onto the loading dock and loading into vehicles assigned to the plurality of dock doors at the loading dock; and
a plurality of loading zones, wherein each loading zone of the plurality of loading zones includes a subset of the plurality of dock doors and a corresponding subset of staging lanes located proximate to the subset of the plurality of dock doors for supplying the finished products for loading into vehicles docked at the subset of the plurality of dock doors, wherein the plurality of loading zones includes a first loading zone including a first subset of dock doors, a first subset of staging lanes located proximate to the first subset of dock doors for supplying the finished products for loading into vehicles docked at the first subset of the plurality of dock doors, wherein the plurality of loading zones includes a second loading zone including a second subset of dock doors, a second subset of staging lanes located proximate to the second subset of dock doors for supplying the finished products for loading into vehicles docked at the second subset of the plurality of dock doors, and wherein the first loading zone includes a first AGV dedicated to the first loading zone for loading vehicles assigned to the first subset of the plurality of dock doors with the finished products taken from the first subset of staging lanes.

13. The facility of claim 12, wherein the first AGV is dedicated to moving within the first loading zone and is responsible for loading the vehicles parked at the first subset of the plurality of dock doors.

14. The facility of claim 13, wherein the first loading zone includes a charger positioned within the first loading zone for charging the first AGV at the first loading zone when the first AGV is idle.

15. The facility of claim 12, wherein the second loading zone includes a second AGV dedicated to the second loading zone for loading vehicles assigned to the second subset of the plurality of dock doors with the finished products from the second subset of staging lanes.

16. The facility of claim 15, further including a control system configured to, based on a trailer order determined at check in to include specific types of the finished products, determine which of the first or second loading zone to direct a trailer based upon which loading zone includes more of the specific types of the finished products than the other.

17. A facility for distributing finished products, the facility comprising:
a loading dock having a plurality of dock doors to accommodate vehicles for loading the finished products;
a staging area located proximate to the loading dock, the staging area including a plurality of staging lanes of the finished products, wherein each staging lane of the plurality of staging lanes is stocked with the finished products for removal onto the loading dock and loading into vehicles assigned to the plurality of dock doors at the loading dock; and
a plurality of loading zones, wherein each loading zone of the plurality of loading zones includes a subset of the plurality of dock doors and a corresponding subset of staging lanes located proximate to the subset of the plurality of dock doors for supplying the finished products for loading into vehicles docked at the subset of the plurality of dock doors, wherein the plurality of dock doors is arranged in series along a first direction and each of the staging lanes is arranged along a second direction orthogonal to the first direction, and wherein each staging lane of the plurality of staging lanes includes A-mover lanes dedicated to pallets of high-volume product and flex lanes reserved for pallets of low-volume product.

18. The facility of claim 17, wherein the flex lanes are configured such that during operation, the flex lanes are stocked with pallets of low-volume product after a trailer has checked in with an order requiring pallets of low-volume product.

19. A facility for distributing finished products, the facility comprising:
a loading dock having a plurality of dock doors to accommodate vehicles for loading the finished products;
a staging area located proximate to the loading dock, the staging area including a plurality of staging lanes of the finished products, wherein each staging lane of the plurality of staging lanes is stocked with the finished products for removal onto the loading dock and loading into vehicles assigned to the plurality of dock doors at the loading dock; and
a plurality of loading zones, wherein each loading zone of the plurality of loading zones includes a subset of the plurality of dock doors and a corresponding subset of staging lanes located proximate to the subset of the plurality of dock doors for supplying the finished products for loading into vehicles docked at the subset of the plurality of dock doors,
wherein pallets are movable in pairs to the staging area.

20. The facility of claim 19, wherein the finished products are movable in pairs from the staging area into the vehicles for loading onto the vehicles.

21. A facility comprising:
a production line including an exit conveyor for providing finished products produced on the production line;
an intermediary storage area where the finished products are stored within the facility after being removed from the exit conveyor;
a loading dock having a plurality of dock doors to accommodate vehicles for loading the finished products;
a staging area located between the intermediary storage area and the loading dock, the staging area including a plurality of staging lanes of the finished products, wherein each staging lane of the plurality of staging lanes is stocked with the finished products from the intermediary storage area for removal onto the loading dock and loading into vehicles assigned to the plurality of dock doors at the loading dock; and
a plurality of loading zones, wherein each loading zone of the plurality of loading zones includes a subset of the plurality of dock doors and a corresponding subset of staging lanes located proximate to the subset of the plurality of dock doors for supplying the finished products for loading into vehicles docked at the subset of the plurality of dock doors,
wherein each loading zone of the plurality of loading zones includes an AGV for loading vehicles assigned to the subset of the plurality of dock doors with the finished products taken from the corresponding subset of staging lanes, wherein each AGV is dedicated to moving within only one designated loading zone for loading the vehicles docked at the subset of the plurality of dock doors with the finished products taken from the corresponding subset of staging lanes, and wherein each AGV takes the finished products from a side of the corresponding subset of staging lanes in facing relationship with the subset of the plurality of dock doors, and
wherein each loading zone includes a charger located within the loading zone for charging the AGV within the loading zone.

22. A facility for distributing finished products, the facility comprising:
a loading dock having a plurality of dock doors to accommodate vehicles for loading the finished products;
a staging area located proximate to the loading dock, the staging area including a plurality of staging lanes of the finished products, wherein each staging lane of the plurality of staging lanes is stocked with the finished products for removal onto the loading dock and loading into vehicles assigned to the plurality of dock doors at the loading dock;
a plurality of loading zones, wherein each loading zone of the plurality of loading zones includes a subset of the plurality of dock doors and a corresponding subset of staging lanes located proximate to the subset of the plurality of dock doors for supplying the finished products for loading into vehicles docked at the subset of the plurality of dock doors; and
a control system configured to, based on a trailer order determined at check in to include specific types of the finished products, determine which of the loading zones to direct a trailer based upon which loading zone includes more of the specific types of the finished products than the others.

23. A facility for distributing finished products, the facility comprising:
a loading dock having a plurality of dock doors to accommodate vehicles for loading the finished products;
a staging area located proximate to the loading dock, the staging area including a plurality of staging lanes of the finished products, wherein each staging lane of the plurality of staging lanes is stocked with the finished products for removal onto the loading dock and loading into vehicles assigned to the plurality of dock doors at the loading dock; and
a plurality of loading zones, wherein each loading zone of the plurality of loading zones includes a subset of the plurality of dock doors and a corresponding subset of staging lanes located proximate to the subset of the plurality of dock doors for supplying the finished products for loading into vehicles docked at the subset of the plurality of dock doors,
wherein the plurality of dock doors is arranged in series along a first direction and each of the staging lanes is arranged along a second direction orthogonal to the first direction, and
wherein each staging lane of the plurality of staging lanes is configured such that it is fully depleted prior to being replenished with further finished products.

24. A facility for distributing finished products, the facility comprising:
a loading dock having a plurality of dock doors to accommodate vehicles for loading the finished products;
a staging area located proximate to the loading dock, the staging area including a plurality of staging lanes of the finished products, wherein each staging lane of the plurality of staging lanes is stocked with the finished products for removal onto the loading dock and loading into vehicles assigned to the plurality of dock doors at the loading dock; and a plurality of loading zones, wherein each loading zone of the plurality of loading zones includes a subset of the plurality of dock doors and a corresponding subset of staging lanes located proximate to the subset of the plurality of dock doors for supplying the finished products for loading into vehicles docked at the subset of the plurality of dock doors, further comprising a transition area upstream of and including the staging area, wherein the facility further includes transition area AGVs dedicated to moving within the transition area, wherein some of the transition area AGVs are dedicated to moving within the transition area to place the finished products into the staging area, and wherein the transition area includes a charger located within the transition area for charging the transition area AGVs within the transition area.

* * * * *